Oct. 11, 1960 R. BACCHI 2,955,486
DUAL OPERATOR FOR VALVES
Filed Jan. 27, 1958 3 Sheets-Sheet 1
FIG_1
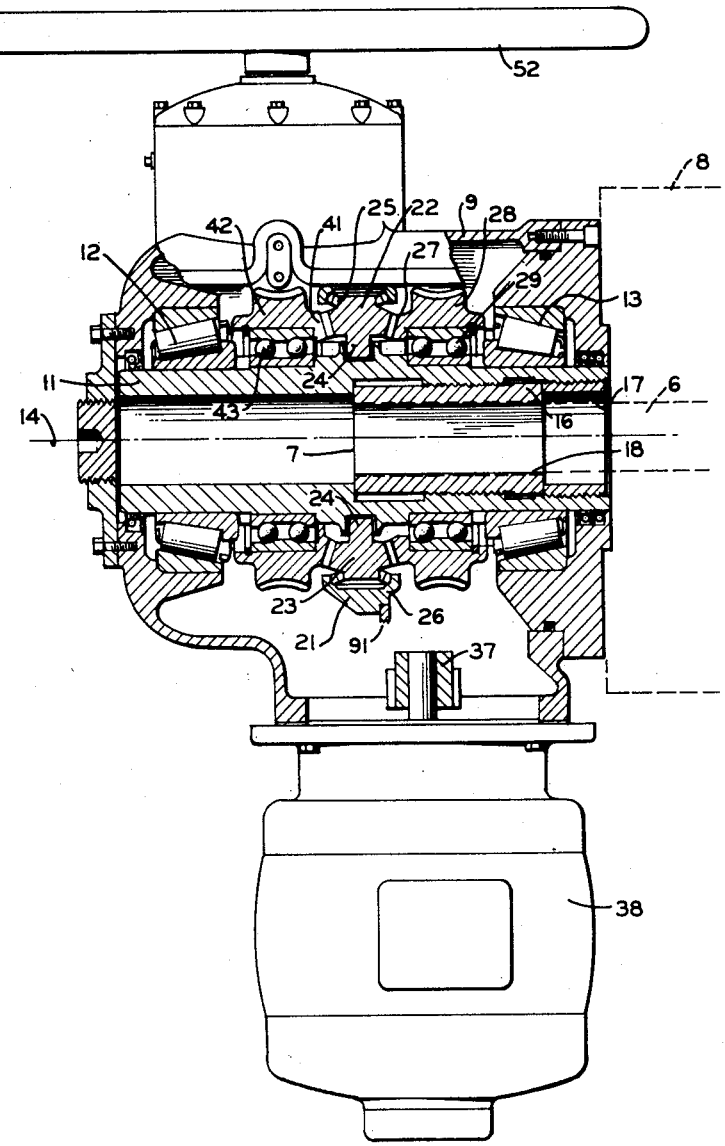
INVENTOR.
RAY BACCHI
BY Lothrop & West
ATTORNEYS Oct. 11, 1960
R. BACCHI
2,955,486
DUAL OPERATOR FOR VALVES
Filed Jan. 27, 1958
3 Sheets-Sheet 2
FIG_2
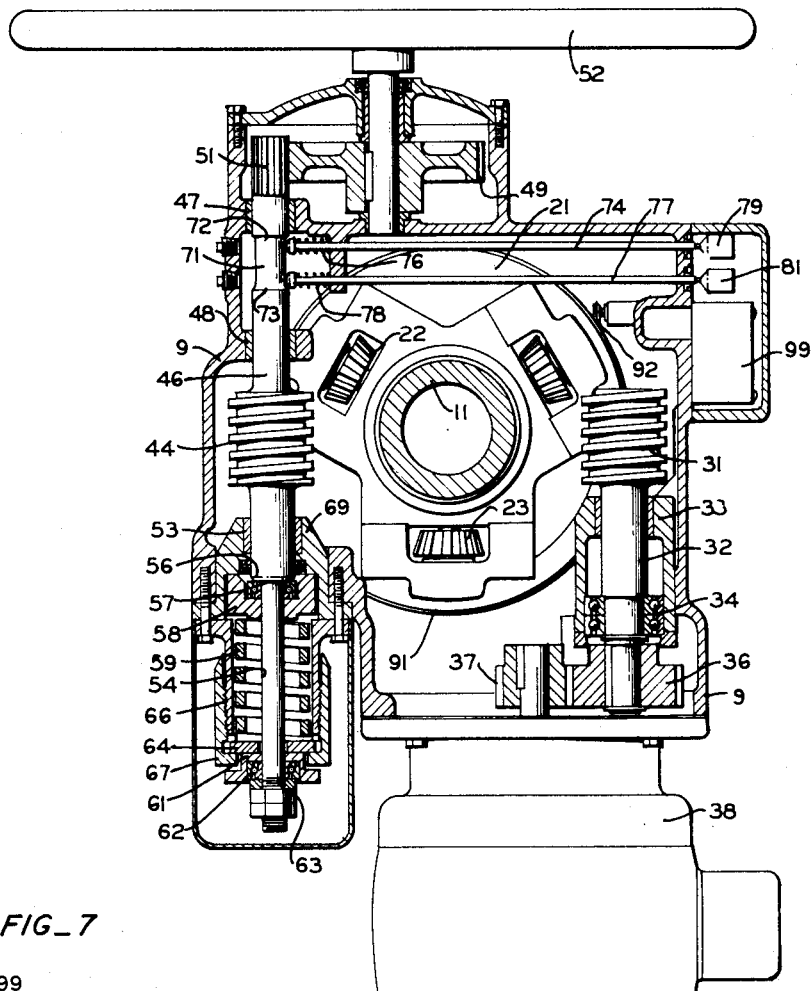
FIG_7
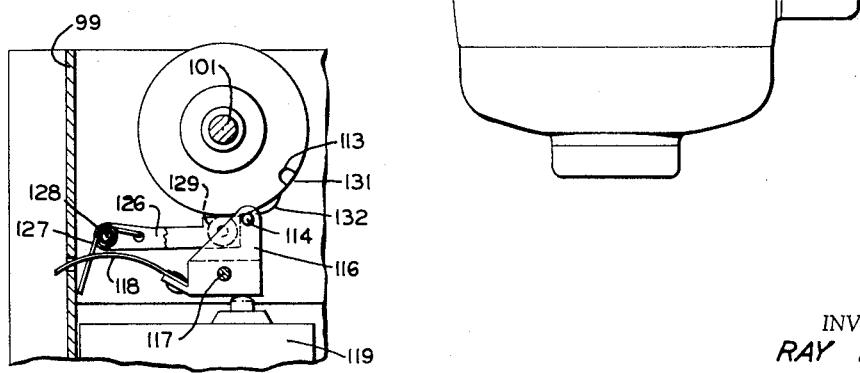
INVENTOR.
RAY BACCHI
BY Lothrop & West
ATTORNEYS Oct. 11, 1960    R. BACCHI    2,955,486
DUAL OPERATOR FOR VALVES
Filed Jan. 27, 1958    3 Sheets-Sheet 3
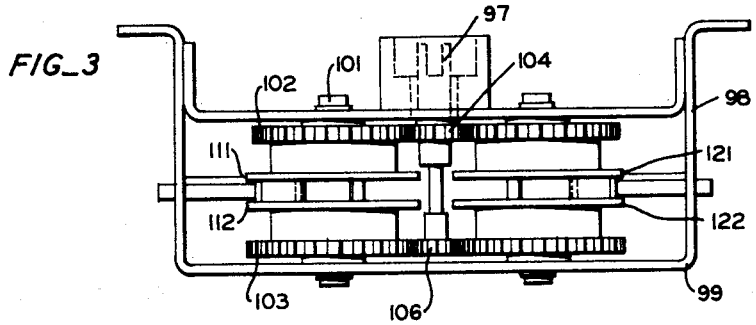
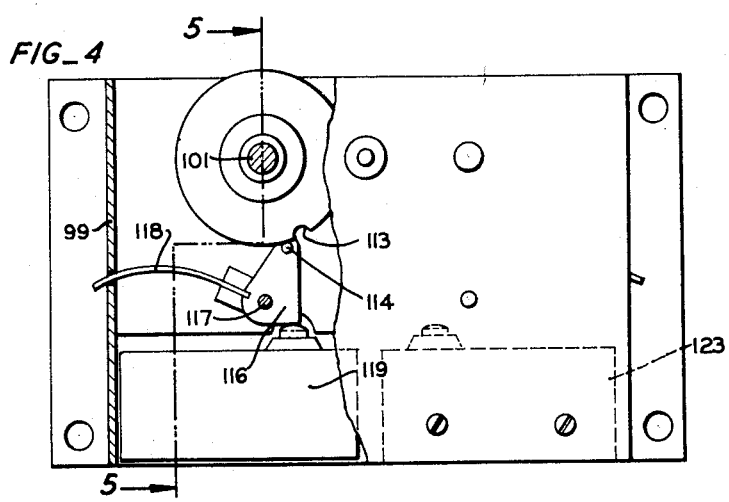
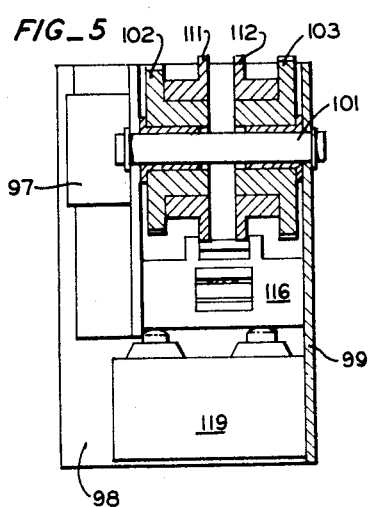
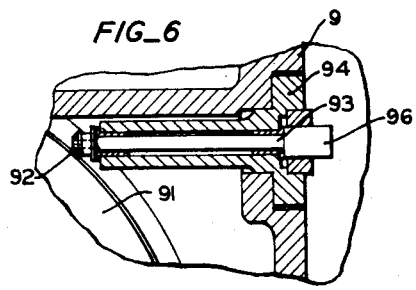
INVENTOR.
RAY BACCHI
BY *Lothrop & West*
ATTORNEYS

United States Patent Office 2,955,486
Patented Oct. 11, 1960

2,955,486

DUAL OPERATOR FOR VALVES

Ray Bacchi, Daly City, Calif., assignor to Baldwin-Lima-Hamilton Corporation, a corporation of Pennsylvania Filed Jan. 27, 1958, Ser. No. 711,366

1 Claim. (Cl. 74—626)

My invention relates to means especially useful to turn a shaft between specified limits particularly a valve shaft such as the shaft of a hydraulic valve utilized in water works or large hydraulic turbine installations. In such uses it is ordinarily necessary to provide for power operation of the valve shaft as well as manual operation thereof. It is also desirable to have the power operated structure automatically position the valve in any one of several positions and to relieve the drive in the event the transmitted torque becomes excessive. A device having some of these characteristics is shown in my co-pending application Serial Number 620,609, filed November 6, 1956, for a "Valve Operator." In the present instance one of the objects of the invention is to provide an improved dual operator of the indicated sort.

Another object of the invention is to provide a dual operator effective accurately to position the driven device in any one of several pre-selected locations.

Another object of the invention is to provide a dual operator effective automatically to stop the transmission of power in the event the torque transmitted exceeds a predetermined amount.

Another object of the invention is to provide a dual operator of improved design having features of compactness, ruggedness and freedom from trouble.

A still further object of the invention is in general to provide an improved dual operator.

Other objects, together with the foregoing, are attained in the embodiment of the invention described in the accompanying description and illustrated in the accompanying drawings in which:

Figure 1 is for the most part a side elevation of a dual operator constructed in accordance with the invention, a portion being in cross section on a central, axial plane;

Figure 2 is a cross section on a plane substantially at right angles to that of Figure 1 some portions being disclosed in elevation, some portions being omitted and other portions being displaced to increase the clarity of disclosure;

Figure 3 is a plan of a position switch mechanism utilized with the device of Figures 1 and 2;

Figure 4 is an elevation of the position switch mechanism, a portion being broken away to disclose the interior;

Figure 5 is a cross section the plane of which is incated by the lines 5—5 of Figure 4;

Figure 6 is a cross section to an enlarged scale of part of the position switch driving mechanism also shown in Figure 2;

Figure 7 is an elevation of a modified form of position switch mechanism.

While the dual operator of the invention can be utilized in connection with numerous different devices it is especially designed for use in connection with valves actuated between an open position and a closed position by rotation of a valve shaft. Often the valve shaft is in the nature of a worm or screw and requires a large number of rotations to move the valve between extreme positions.

Since the valve itself is no part of the present invention, it is indicated only by dotted lines showing the upper end of a valve shaft 6 terminating in a square portion 7. The valve also includes some sort of casing 8. This serves as the support for a housing 9 for the operator. Within the housing a hollow drive shaft 11 is mounted in suitable anti-friction bearings 12 and 13 for rotation about a central axis 14 and against displacement by axial thrust. In order that the shaft 11 can be accommodated to any one of a number of different valves, it is preferably bored out to receive a removable keyed sleeve 16 locked in position by a removable ring nut 17 and having on its interior a square opening 18 to conform to the square portion 7 of the particular valve shaft utilized. For some installations, the opening 18 is threaded to receive a threaded valve shaft or stem.

In order to rotate the hollow drive shaft 11 a differential drive mechanism generally designated 21 is employed. This mechanism includes a number of bevel pinions 22 and 23 each of which has an inner radial bearing 24 carried in the shaft 11 and also has an outer radial bearing 25 disposed in a carrier body 26 disposed within the housing concentrically with the axis 14.

The pinions 22 and 23 are designed to be driven dually. One of the drives includes a power bevel gear 27 disposed to mesh with one side of the pinions 22 and 23 and concentrically located in the housing with respect to the axis 14. The power bevel gear 27 is united with a power worm gear 28 to form an assembly therewith, the assembly being mounted concentrically on the drive shaft 11 but is rotationally isolated therefrom by a mounting bearing 29. In this fashion, the power worm gear 28 can be rotated independently of the rotation of the guide shaft 11.

Meshing with the power worm gear 28 is a power worm 31 (Figure 2) disposed within the housing at right angles to the axis 14 and mounted on a shaft 32 carried in bearings 33 and 34. The power worm 31 is held against axial displacement, although it is readily rotatable. On the shaft 32 of the power worm is a driven gear 36 meshing with a driving gear 37 rotated by means of an electric motor 38 suitably secured to the housing 9.

As the other portion of the dual drive mechanism there is provided a manual operator. Meshing with the other side of the bevel pinions 22 and 23 is a manual bevel gear 41 disposed concentrically with the axis 14. United with the manual bevel gear 41 is a manual worm gear 42 carried by a bearing 43 supported on the shaft 11 so that the manual bevel gear 41 and the manual worm gear 42 turn in unison, but independently of the shaft 11.

Meshing with the manual worm gear 42 is a manual worm 44 (Figure 2) carried on a manual worm shaft 46. This shaft is mounted in the housing 9 not only for rotation about an axis at right angles to the axis 14, but also for end wise or axial movement. For this reason, the shaft 46 is carried in sleeve bearings 47 and 48. Motion is imparted to the shaft 46 by means of a manual drive gear 49 meshing with a manual pinion 51 formed at the end of the shaft 46. A hand wheel 52 is effective to rotate the gear 49 and through the gear 51 likewise to rotate the shaft 46. The engagement of the pinion 51 and the gear 49 is such that the pinion 51 can move axially with respect to the gear 49.

Axial movement of the shaft 46 is normally precluded by a resilient centralizing device. The shaft 46 on its side away from the bearings 47 and 48 is carried in a sleeve bearing 53 and is reduced in diameter to constitute a rotary spindle 54 and affording a shoulder 56. Against the shoulder is disposed an anti-friction thrust bearing 57 carrying an abutment ring 58. This is in contact with one end (the upper end) of a coil spring 59. An abutment ring 61 is positioned with respect to the spindle 54 by an anti-friction thrust bearing 62 and is adjustably held by adjusting lock nuts 63.

Interposed between the other end (the lower end) of the spring 59 and the member 61 is a washer 64. This has an axial movement limited by abutment against the lower end of a surrounding sleeve 66, the extent of the movement being adjustably set by a flanged enclosing cap 67 threaded onto the sleeve 66. The sleeve 66 is slightly smaller in diameter than the member 58 and the washer 64.

In the operation of this device, whenever the end or axial thrust or the torque transmitted through the manual worm 44 exceeds a predetermined amount in one direction, the shaft 46 is translated axially so that the member 58 compresses the spring 59. At values of torque below the predetermined value, the member 58 is held tightly seated against the bearing support 69. When there is excessive thrust or torque there is a corresponding axial translation, and the member 58 leaves its seat and finally abuts against the sleeve 66, limiting the movement. Thus, there is provided a definite range of axial translation of the shaft 46 in one direction whenever the torque or thrust in that direction exceeds a predetermined value, as set by the spring 59.

Whenever the torque or thrust exceeds a predetermined value, as set by the spring 59, but in the opposite direction, the spindle 54 moves the member 61 against the washer 64. The washer normally is held tightly seated against the flanged end of the cap 67, but upon occurrence of excessive torque or thrust the washer 64 then is moved to compress the spring 59 until the member 61 abuts the flange end of the sleeve 67. In this way there is provided a predetermined, but limited amount of movement of the shaft 46 in the opposite direction whenever the torque or thrust in the opposite direction exceeds the set value.

Advantage is taken of the end movement of the shaft 46 to control the electric motor 38 whenever the torque exceeds the set limitations in either direction. To that end, the shaft 46 has a reduced portion 71 serving to provide cam surfaces 72 and 73. These are effective, depending upon the direction of axial translation of the shaft, to move either an upper rod 74 normally held against the shaft by a spring 76 or a lower rod 77 normally held against the rod 71 by a spring 78. The upper rod 74 when translated to the right in Figure 2 actuates an electric switch 79 in the circuit of the electric motor 38 whereas the lower rod 77 when translated to the right in Figure 2 actuates an electric switch 81 also in the electrical circuit of the motor 38. When either of the rods 74 or 77 is translated to actuate the corresponding switch, the motor circuit is interrupted and the motor 38 is stopped. Thus, when there is excessive torque or thrust in either direction the motor 38 ceases to function.

Pursuant to the invention it is possible also to stop the motor 38 whenever the driven device such as a valve arrives in a predetermined location. This location is measured by the position of the driving shaft 11. It is also normally measured by the position of the differential mechanism 21. Around its periphery the carrier body 26 supports a driving gear 91 meshing with a driven pinion 92 (Figures 2 and 6). The pinion 92 is on a shaft 93 journalled in a holder 94 mounted in the housing 9. There is a rotationally solid, but axially disconnectable junction 96 with the driven shaft 97 (Figure 3) of a position cam mechanism 98. As the body 26 is rotated into various positions the shaft 93 takes up corresponding positions. Since the gear ratio between the gear 91 and the pinion 92 is considerable, several rotations of the shaft 93 corespond to but a single rotation of the body 26 so that the position of the shaft 11 can be very accurately represented by the position of the shaft 93.

The position cam device includes a supplementary frame 99 removably secured to the housing 9. The frame 99 carries a cross shaft 101 on which (Figures 3 and 5) are freely mounted for rotation a pair of driven gears 102 and 103. These gears are of slightly different diameter and each of them meshes with the respective one of two pinions 104 and 106 of correspondingly different diameters and fast on the driving shaft 97. With this arrangement, the two gears 102 and 103 are rotated at slightly different rates.

Each one of the gears 102 and 103 carries with it one of two position cams 111 and 112. There is a firm frictional engagement so that under all normal loads the cams turn in unison with their respective gears. Each of the cams has on its periphery a notch 113 or other irregularity extending either radially inwardly or radially outwardly. Because of the slight difference in the rate of rotation of the cams the notches 113 come into registry at a selected location only once for a large number of shaft rotations.

When both of the notches 113 are in axial alignment in that location they simultaneously receive a cross shaft 114 on a switch lever 116 mounted for rocking movement in the frame 99 by a shaft 117. A bow spring 118 is connected to the lever 116 and also to the frame 99 so that the shaft 114 is urged against the cams and into the aligned notches 113. Normally the lever 116 holds an electric switch 119 in closed position but when the shaft 114 is sprung into the aligned notches 113 by the bow spring 118, the switch 119 is actuated into open position. The switch 119 is electrically wired in series (not shown) with one of the switches 79 or 81; for example, the switch 79.

Likewise disposed in the frame 99 is an exactly similar cam mechanism including cams 121 and 122 and simultaneously driven with the cams 111 and 112. The cams 121 and 122 have their own normally closed switch 123. This is opened when the two cams 121 and 122 get into a predetermined alignment at the selected location. The switch 123 is connected in series (not shown) with the switch 81.

Since the cams 111 and 112 are frictionally retained in any set position on their supporting and driving gears 102 and 103 and since the cams 121 and 122 are similarly mounted, it is possible to set the position mechanism so that the switches 119 and 123 are each opened at any selected position of the ring 21 and of the shaft 11 and of the valve being actuated. When either of the switches is opened, the motor 38 is deenergized.

As an alternative form of position switch mechanism, the structure shown in Figure 7 is sometimes utilized as it is free of any tendency to jam under heavy loads. For the most part, this mechanism is exactly as above described. An exception is that the cross shaft 114 is shortened so that it falls into only one notch 113. This notch can be entered only when a restraining or latching lever 126 is out of its normal position in abutment with the cross shaft 114. A spring 127 on the mounting shaft 128 of the lever 126 urges the lever into latching position and with a follower 129 on the lever riding on the rim of a cam 131 similar to the cam 111 but having an extending lobe 132, instead of a notch 113. Just before the cross shaft 114 is in position to enter its notch 113, when the cams are in the proper position, the lobe 132 forces the lever 126 out of latching position so that the cross shaft 114 is able to enter the notch 113 quite freely.

With this structure and with an appropriate position cam setting, the dual operator is propelled by power until such time as the valve or the ring 26 achieve the selected location. At that location the electric motor 38 is deenergized. Customarily, the cams are set so that this deenergization takes place adjacent the full open position of the valve. This is all of the control that normally is required.

Under some circumstances the valve itself tends to jam or balk before it gets to its fully open position or before it gets to its fully closed position. This is often due to debris collecting in the valve. Under such conditions if the selected torque to be transmitted by the dual power operator is exceeded, the switch 79 or 81 is opened, even before the position switches are opened. This prevents excessive loads on the valve or on any of the operating machinery and especially prevents overload of the motor 38.

There is thus provided a structure which positions the valve by power in either of two positions (usually the two extreme positions), but which stops the operation of the power unit in the event the necessary torque to move the valve exceeds a pre-selected value.

When the valve operator is manually controlled it is not necessary to rely upon the position switches or the torque responsive switches. Normally the operator can by observation or by feel determine the position and the torque values involved. However, if this is not feasible the switches 79 and 81 can operate indicator lights and the switches 119 and 123 can likewise operate indicator lights so that the manual operator can readily discern not only the position or positions of the valve, but likewise the amount of torque (if in excess of a predetermined set value) which is being transmitted to the valve.

What is claimed is:

A dual operator for valves comprising a housing, a drive shaft rotatably mounted in said housing, a planetary ring disposed in said housing concentrically with said drive shaft, planetary bevel pinions journalled in said ring and in said shaft, a power worm gear disposed in said housing concentrically with said drive shaft and journalled thereon, a power bevel gear fixed to said power worm gear and meshing with one side of said bevel pinions, a power worm meshing with said power worm gear, means for mounting said power worm solely for rotation in said housing and against axial translation therein, power means for driving said power worm, a manual worm gear disposed in said housing concentrically with said drive shaft and journalled thereon, a manual bevel gear fixed to said manual worm gear and meshing with the other side of said bevel pinions, a manual worm mounted in said housing for rotary and axial motion and meshing with said manual worm gear, means for yieldably urging said manual worm into an axially central position, means for controlling said power means, means actuated by movement of said manual worm out of said central position for actuating said controlling means, and rotary cam means driven by said planetary ring for actuating a position switch to stop said power means at predetermined positions of said drive shaft.

References Cited in the file of this patent

UNITED STATES PATENTS

| | | |
|---|---|---|
| 1,948,709 | Hackethal | Feb. 27, 1934 |
| 2,005,891 | Elberty | June 25, 1935 |
| 2,781,616 | Estabrook | Feb. 19, 1957 |